May 15, 1951     J. H. KNAPP     2,552,856
MACHINE FOR AUTOMATICALLY PREPARING
AND VENDING LIQUID FOODS

Filed Dec. 17, 1947     9 Sheets-Sheet 2

INVENTOR.
Joseph H. Knapp
BY
ATTORNEY.

INVENTOR.
Joseph H. Knapp

May 15, 1951  J. H. KNAPP  2,552,856
MACHINE FOR AUTOMATICALLY PREPARING
AND VENDING LIQUID FOODS
Filed Dec. 17, 1947 9 Sheets-Sheet 4
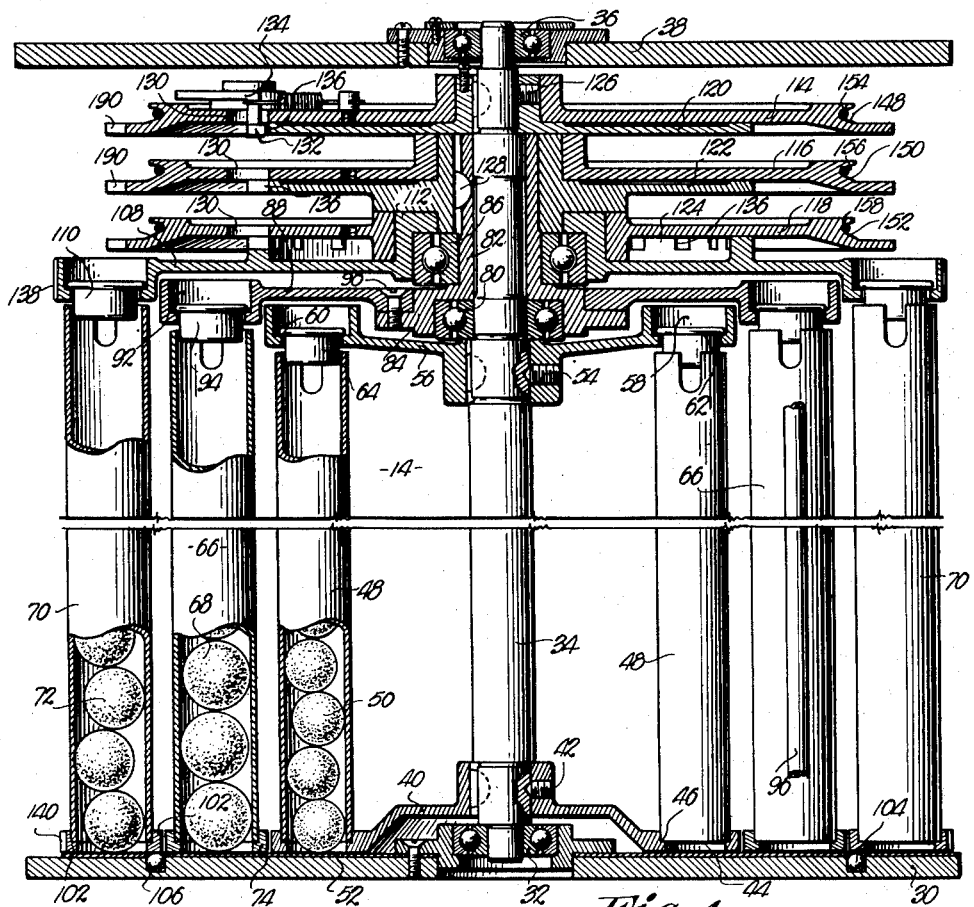
Fig. 4.
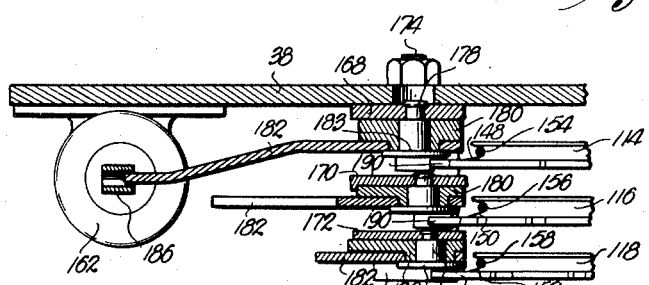
Fig. 5.
INVENTOR.
Joseph H. Knapp
BY
ATTORNEY.

May 15, 1951   J. H. KNAPP   2,552,856
MACHINE FOR AUTOMATICALLY PREPARING
AND VENDING LIQUID FOODS
Filed Dec. 17, 1947   9 Sheets-Sheet 5

Inventor
Joseph H. Knapp
By
Attorney

May 15, 1951 J. H. KNAPP 2,552,856
MACHINE FOR AUTOMATICALLY PREPARING
AND VENDING LIQUID FOODS
Filed Dec. 17, 1947 9 Sheets-Sheet 6
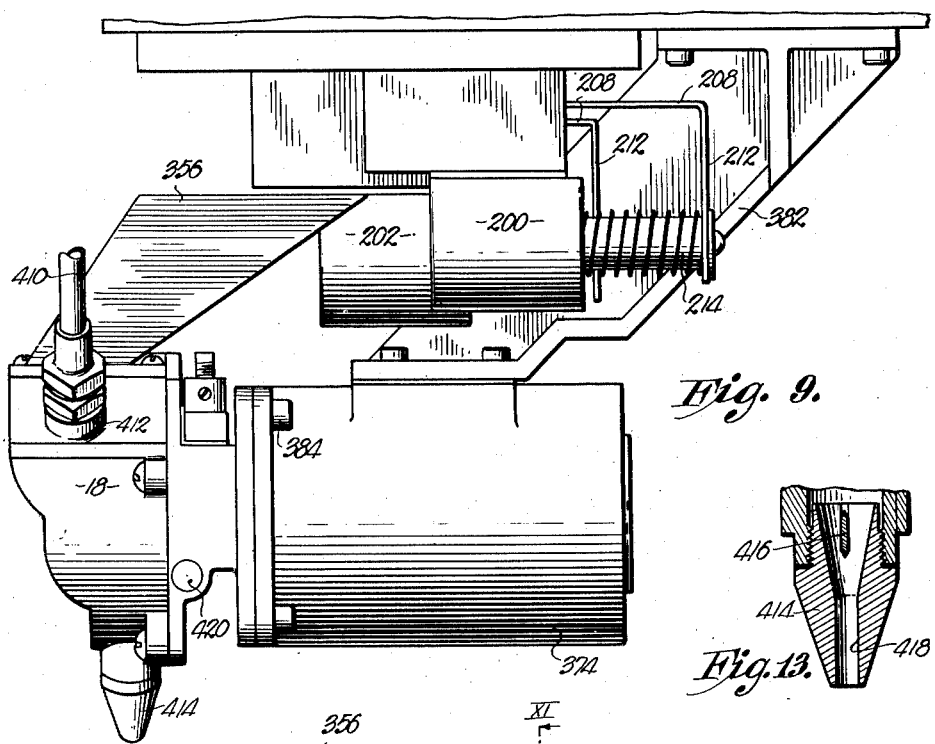
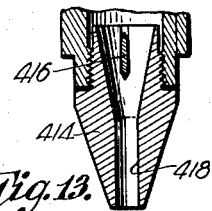
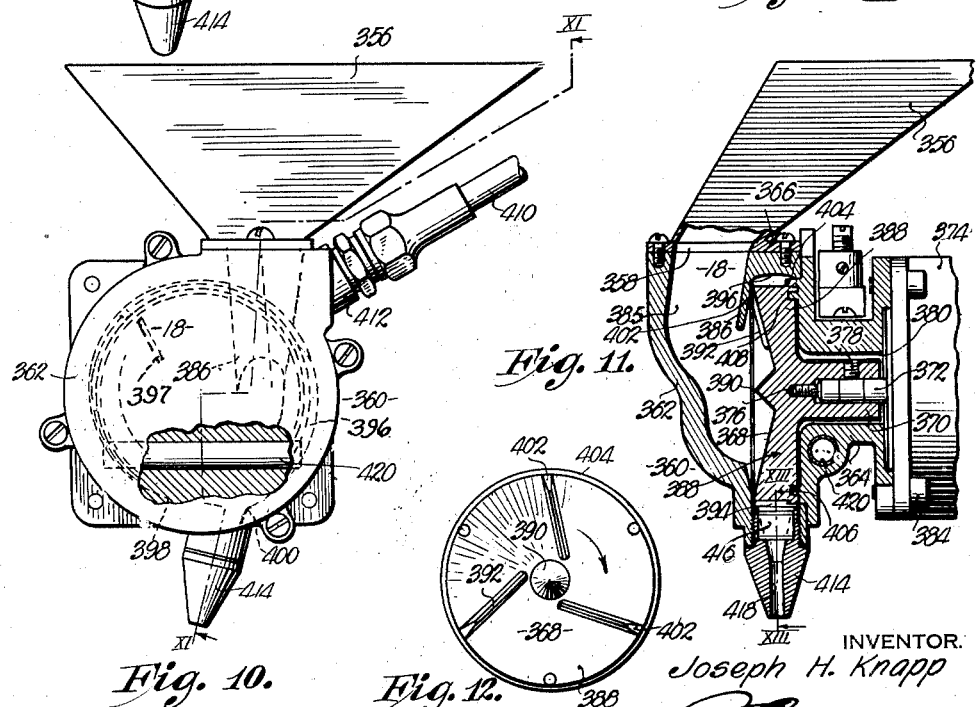
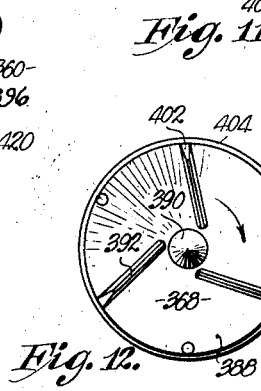
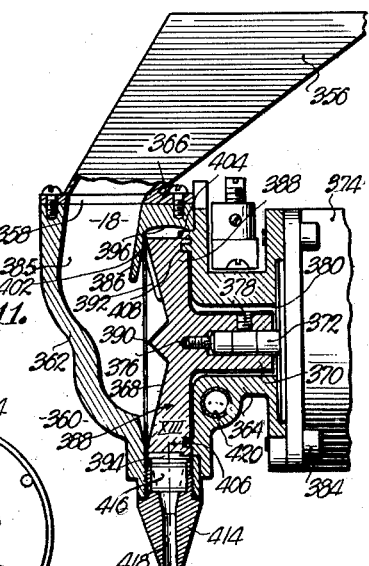
INVENTOR.
Joseph H. Knapp
BY
ATTORNEY.

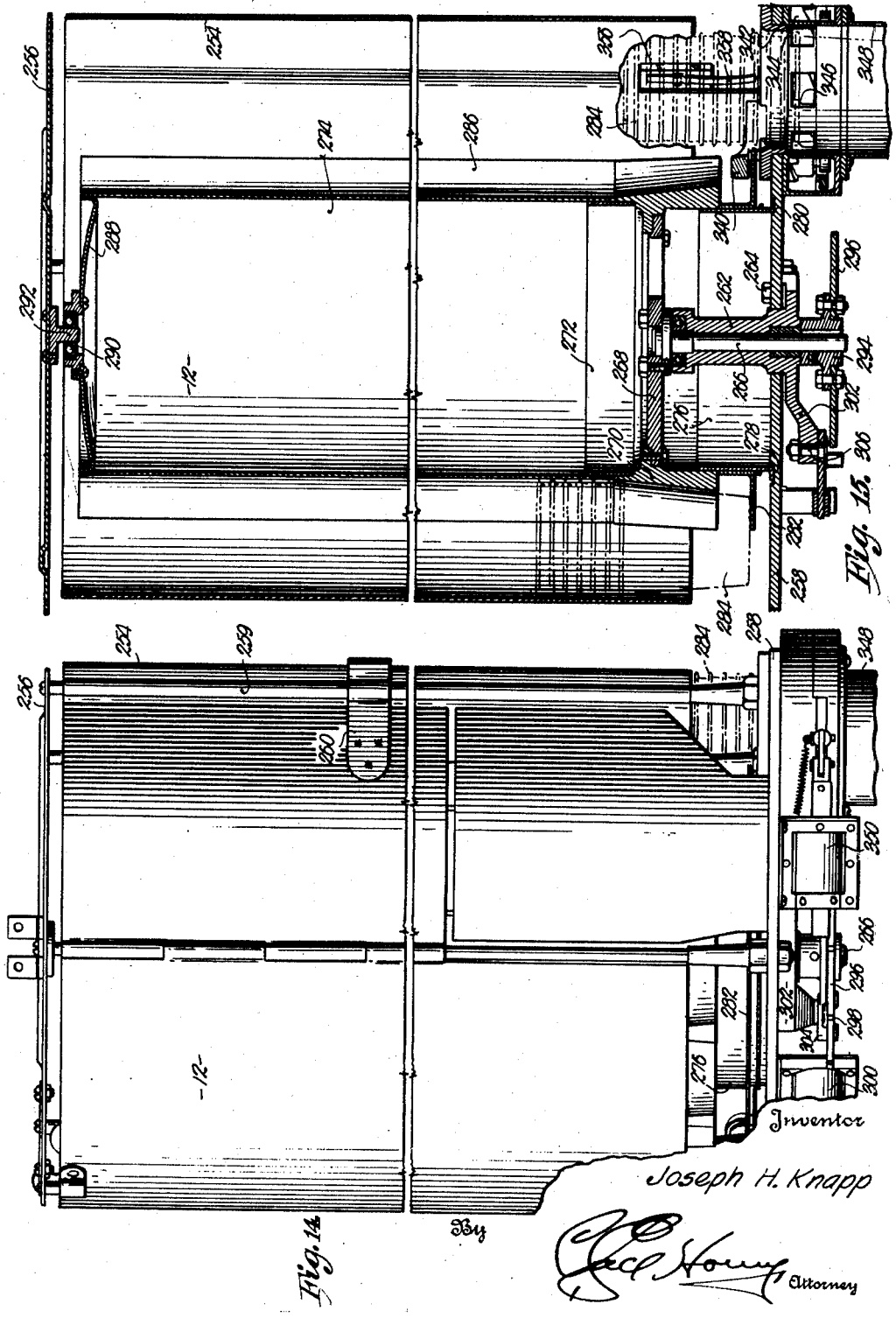

May 15, 1951
J. H. KNAPP
2,552,856
MACHINE FOR AUTOMATICALLY PREPARING AND VENDING LIQUID FOODS
Filed Dec. 17, 1947
9 Sheets-Sheet 8
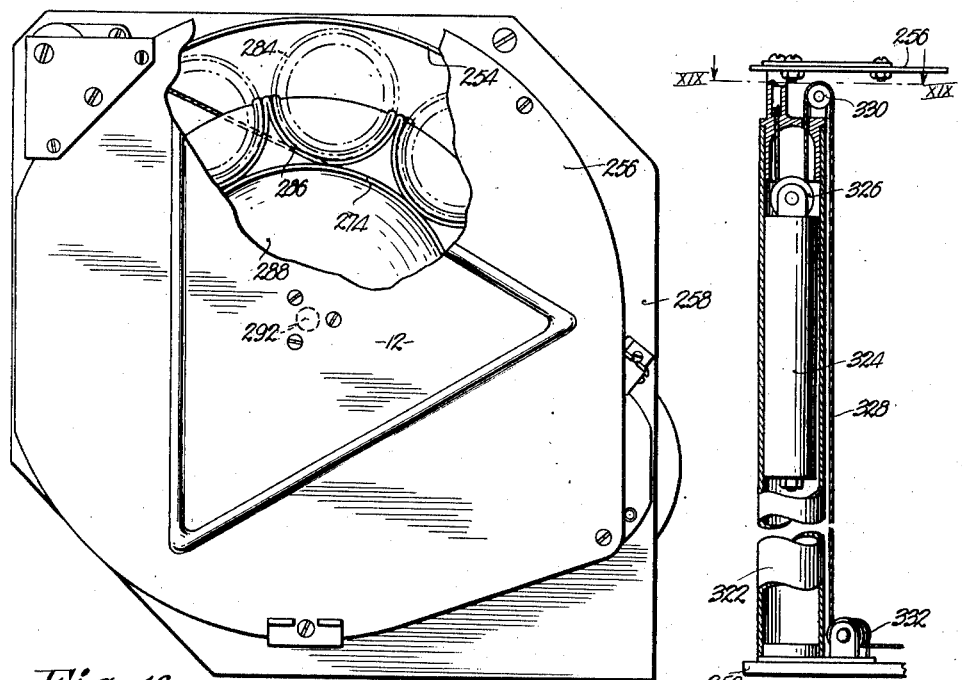
Fig. 16.
Fig. 18.
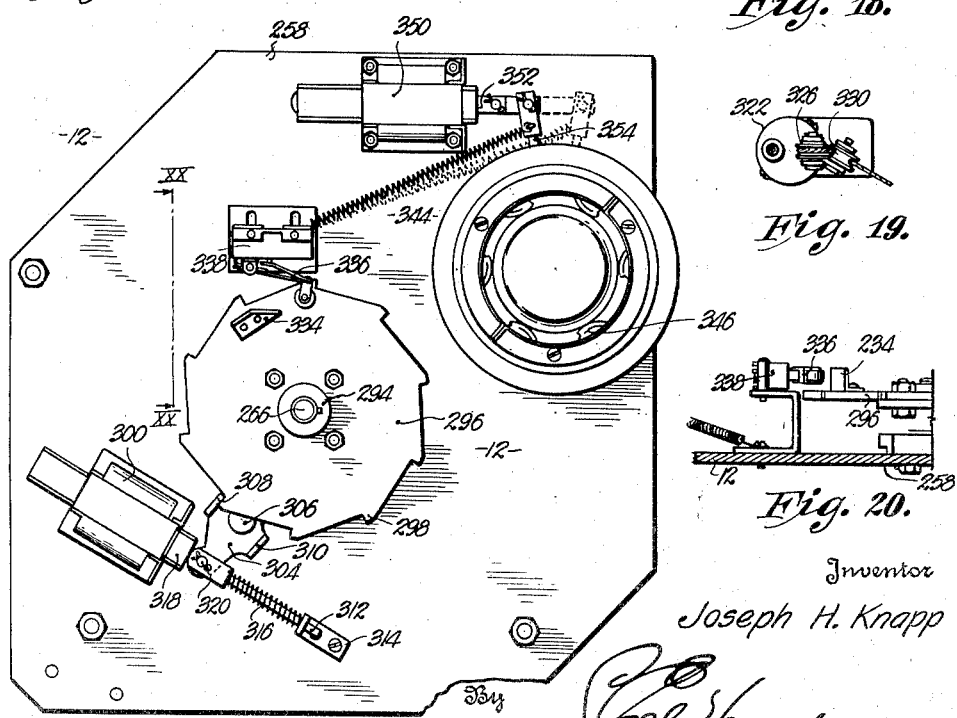
Fig. 17.
Fig. 19.
Fig. 20.
Inventor
Joseph H. Knapp
By
Attorney Patented May 15, 1951

2,552,856

UNITED STATES PATENT OFFICE 2,552,856

MACHINE FOR AUTOMATICALLY PREPARING AND VENDING LIQUID FOODS

Joseph H. Knapp, Kansas City, Mo., assignor to C. Earl Hovey, Kansas City, Mo., trustee Application December 17, 1947, Serial No. 792,236

3 Claims. (Cl. 225—21)

This invention relates to the field of vending machines, and particularly to apparatus capable of automatically making a hot drink such as coffee and dispensing the same to a point accessible to the purchaser thereof upon deposit of a coin or like medium.

The primary aim of this invention is to provide a hot coffee making machine having a combination of parts, apparatus and assemblies operable to dispense hot coffee in the form desired by the purchaser thereof, i. e. black coffee, coffee plus cream, coffee plus sugar, or coffee plus cream and sugar, all automatically upon proper selection and correct deposit of a coin by the said purchaser.

This is a continuation in part of my co-pending application for U. S. Letters Patent covering "Hot Drink Maker and Vending Machine," filed February 28, 1945, and bearing Serial No. 580,253, and has for its most important object to provide a machine of such character that is more efficient in its operation, less expensive to manufacture, devoid of a multiplicity of complicated and unnecessary parts, and relatively simple in operation as well as maintenance.

An important object of this invention is the provision of a hot coffee making machine utilizing ingredients in the nature of small pellets, including coffee, sugar and cream and having a novel dispensing assembly capable of continually feeding such selected pellets until a large supply thereof is exhausted.

Another important object of this invention is to provide a hot coffee making and vending machine having a pellet dispensing assembly constituting a number of rotatable drums, there being a drum for the coffee, sugar and cream pellets, each having a plurality of open bottom cylinders for the pellets and movable successively to a discharge opening and feeding mechanism as the drum is caused to rotate.

A further object of this invention lies in the provision of a hot coffee maker having a cup feeding apparatus operable to dispense cups singly for receiving the pellets, said apparatus controlling the entire machine, i. e. the exhausting of the cup supply automatically rendering the entire machine inoperable.

A still further object is to provide a drink machine wherein a supply of cups is replenished as each group thereof becomes exhausted by operating the cup dispenser to move another group of cups into a feeding position until all groups thereof have been used.

Another aim is to provide in a hot coffee making machine having a cup, spoon, ingredient, and hot liquid dispenser, means for causing the machine to operate in predetermined sequence each time a coin is deposited whereby a cup and spoon are fed and the ingredients and hot liquid discharged into the cup during each cycle of operation.

Another novel feature of this invention lies in a special formed crusher for the dispensed pellets, said crusher being operable to grind and crush the pellets into a finely powdered form prior to movement thereof into a cup.

In furtherance of the aforesaid feature of providing a crusher for the pellets, another very important object lies in the way the hot water is directed into the crusher for admixing with and flushing out the powdered ingredients, and still further in the way the crusher is sterilized after each use by an additional flushing thereof by a discharge of hot water.

Other important objects of this invention include the precise construction of the ingredient dispenser, the cup dispenser and the crusher; the way in which the ingredient assembly is maintained in a dry condition; the manner in which steam from the flowing hot water and from the poured drink is handled; the way in which the cabinet is made virtually verminproof; the way in which weights are used as the sole power for actuating the cup and the ingredient dispenser; and details of construction and assembly of all units generally whereby to house the same in a relatively small, compact and attractive cabinet.

Many additional aims, objects and novel features will be made clear during the course of the following specification, reference being had to the accompanying drawings, wherein:

Fig. 4 is a side elevational view of the ingredient dispenser, parts being broken away and other parts being in section to reveal details of construction.

Fig. 5 is a fragmentary cross sectional view taken on line V—V of Fig. 3.

Fig. 9 is a fragmentary side elevational view of the ingredient feeding mechanism showing a part of the pellet crusher.

Fig. 10 is a side elevational view of the pellet crusher, per se, parts being broken away for clearness.

Fig. 11 is a cross-sectional view taken on irregular line XI—XI of Fig. 10.

Fig. 12 is a side elevational view of the normally innermost face of the rotor showing the same entirely removed from the crusher.

Fig. 13 is a fragmentary, detailed view taken on line XIII—XIII of Fig. 11.

Fig. 14 is a side elevational view of the cup dispenser per se.

Fig. 15 is a vertical, substantially central cross-sectional view taken through the dispenser shown in Fig. 14.

Fig. 16 is a top plan view of the cup dispenser, parts being broken away for clearness.

Fig 17 is an inverted plan view thereof.

Fig. 18 is a fragmentary, detailed view of the weight apparatus entirely removed from the cup dispenser, parts being in section.

Fig. 19 is a detailed view taken on line XIX—XIX of Fig. 18.

Fig. 20 is a fragmentary, detailed view taken on line XX—XX of Fig. 17 looking in the direction of the arrows.

Figure 1:
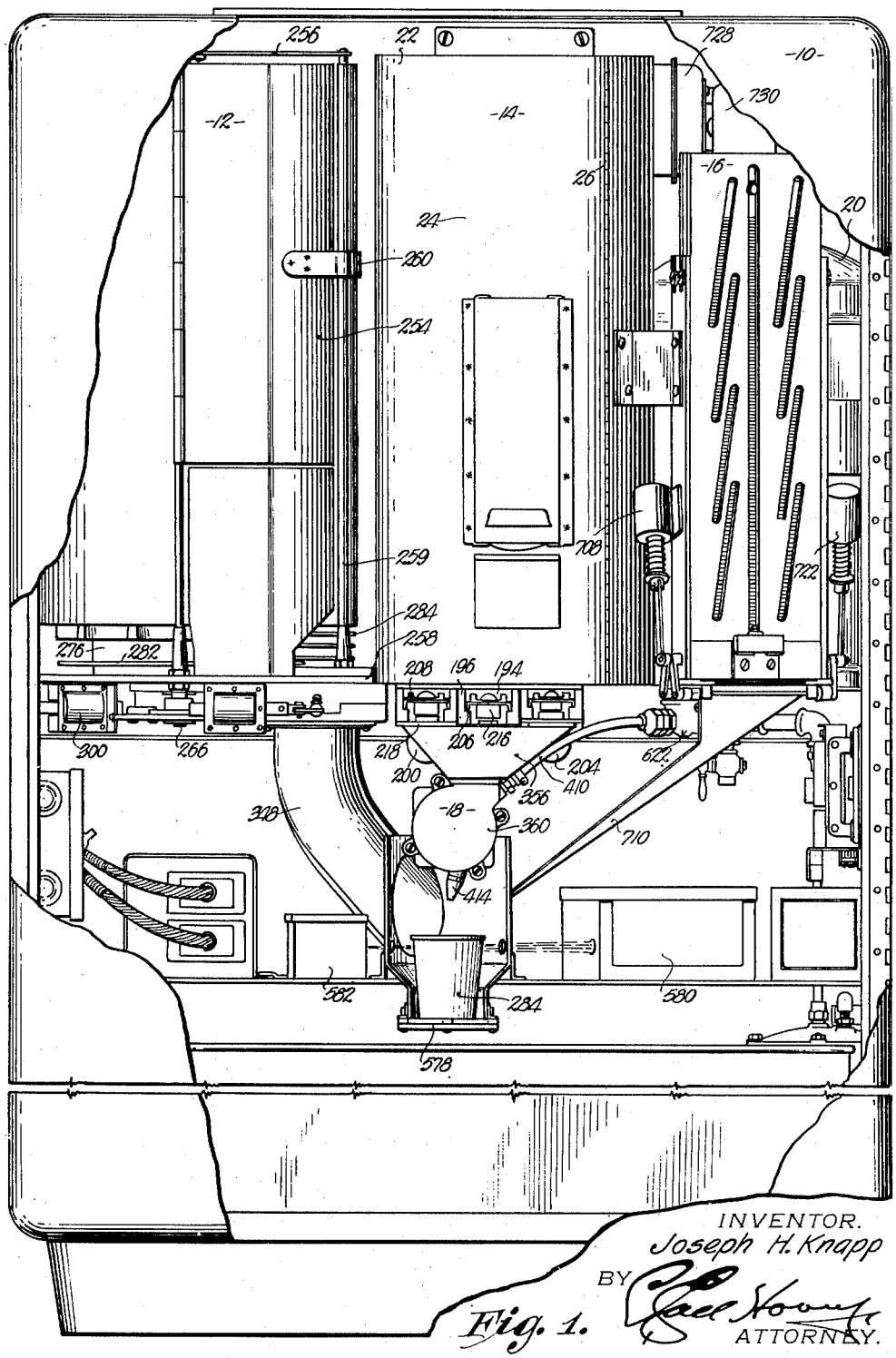
Figure 1 is a front elevational view of a hot coffee making machine made in accordance with my present invention, part of the cabinet door being broken away to reveal interior construction.
Figure 2:
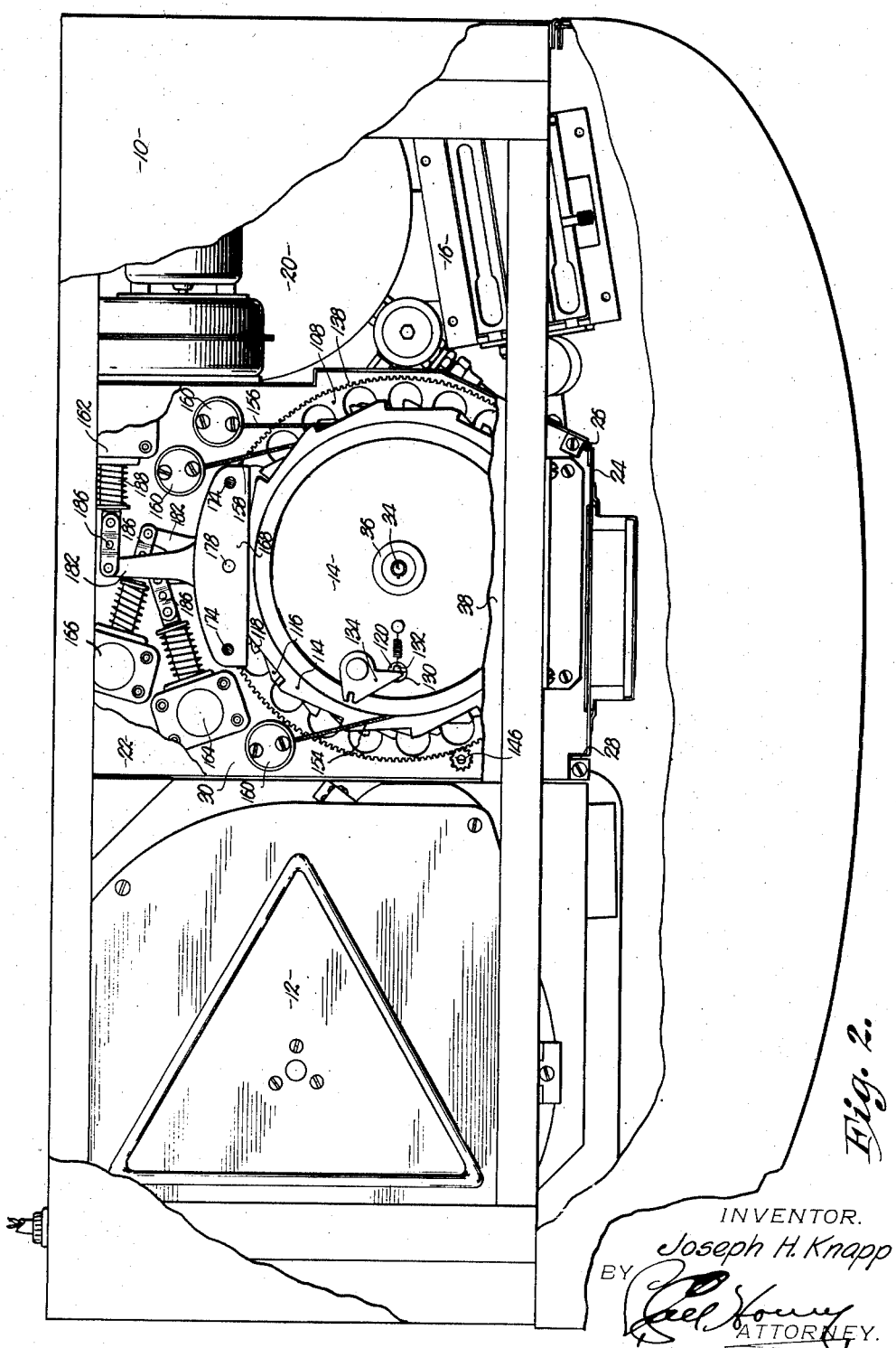
Fig. 2 is a top plan view thereof, the cabinet being broken away to reveal details of construction.

Designated broadly, the hot coffee making and dispensing machine about to be described, comprises a cabinet 10 having mounted therein a cup dispenser 12, an ingredient dispensing assembly 14, a spoon discharge mechanism 16, a crusher 18 (all shown in Fig. 1), and a hot water boiler 20 shown more clearly in Fig. 2. Accordingly, this specification will hereinafter be subdivided in that manner, with a final complete description of operation and inter-relation of parts.

*Ingredient dispensing assembly*

Figure 3:
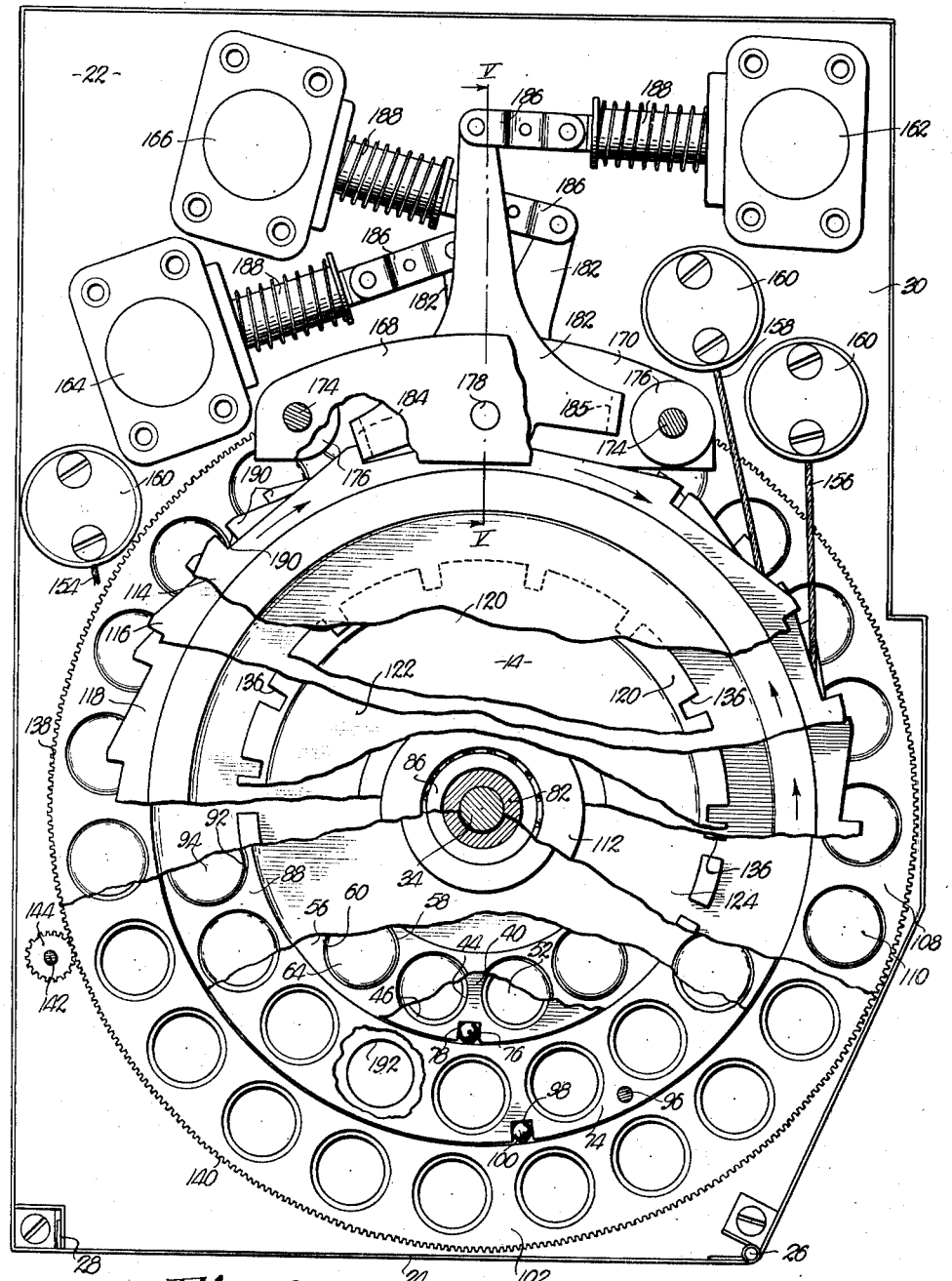
Fig. 3 is a top plan view of the ingredient dispenser, the top of the cabinet being entirely removed and various parts being broken away for clearness.

As clearly indicated in Figs. 1 and 3, the cabinet 10 has suitably mounted therein a closed chamber 22 provided with a door 24, mounted on a hinge 26 and having interlocking structure 28 to provide a tightly sealed space for the ingredient dispensing assembly 14.

Referring now to Fig. 4, a plate 30 forms the bottom of the chamber 22, and a bearing 32 mounted on the uppermost face of the plate 30, rotatably receives the lowermost end of a vertical shaft 34. This shaft 34 extends upwardly through the chamber 22 and has its uppermost end journalled in a bearing 36 secured to a top wall 38 for the chamber 22.

The shaft 34 carries thereon framework for supporting a plurality of cylinders, arranged in a circle to present rotatable drums. Each of the drums includes an upper and lower framework member, there being three of such drums illustrated for sugar, cream and coffee pellets respectively.

The coffee drum comprises a disc 40, secured at its center directly to the shaft 34 adjacent the bearing 32 by a set screw 42. The marginal edge of this disc 40 has a number of openings 44 formed therein and disposed in a circle as shown in Fig. 3. These openings 44 are shouldered as at 46 to receive the lowermost open end of a like number of cylinders 48. The cylinders 48 are all vertically disposed and designed to recive a plurality of relatively small, spherical pellets 50 preformed from coffee granules suitably bonded together. A stainless steel panel 52 on the uppermost face of the plate 30 receives the lowermost of the pellets 50 in the cylinders 48.

At the uppermost end of the cylinders 48 and secured to the shaft 34 intermediate its ends by a set screw 54 is another disc 56. This disc 56 has a number of cups 58 arranged in a circle and evenly spaced throughout its marginal edge. The bottom of said cups 58 are open as shown in Figs. 3 and 4 and are shouldered as at 60 to receive an external flange 62 of a plug 64, loosely and removably inserted in the cups 58. These plugs 64 extend downwardly below the cups 58 to receive the uppermost open ends of the cylinders 48.

The center rotatable drum has a number of vertical cylinders 66 similar to the cylinders 48 for cream pellets 68 (formed by any well known process of dehydration). And, the outermost drum, disposed concentrically with the two innermost drums and with the shaft 34 has a number of cylinders 70 for sugar pellets 72.

The cylinders 66 are supported at the lowermost ends thereof by a ring 74 formed with a number of shouldered openings in the same manner as the disc 40. This ring 74 completely circumscribes the disc 40 and rotates upon a number of ball bearings 76 disposed within notches 78 in the marginal edge of the disc 40 between openings 44 thereof. The depth of the notches 78 is slightly less than the diameter of the ball bearings 76, the latter of which rest and roll on the panel 52.

A bearing 80 on the shaft 34 immediately above the disc 56 receives a sleeve 82 freely rotatable on the shaft 34. This sleeve 82 extends upwardly, terminating near the uppermost end of the shaft 34, and has a stepped, outwardly and downwardly extending flange 84 thereon near its lowermost end. One step of the flange 84 receives a bearing 86 which encircles the sleeve 82, while another step thereof carries a disc 88 to which it is fastened by screws as at 90. Still another portion of the flange 84 circumscribes the bearing 80 as shown in Fig. 4.

The marginal edge of the disc 88 is formed precisely the same as the disc 56 with cups 92 and plugs 94 for holding the upper ends of the cylinders 66. A number of pins 96 disposed adjacent certain of the cylinders 66 join together the disc 88 and the ring 74 to maintain the cylinders 66 parallel and perpendicular to the panel 52. Thus, the entire center drum for the cream pellets 68 is suspended from the sleeve 82 which in turn is supported by the bearing 80 supported by the shaft 34.

The ring 74 has notches 98 and ball bearings 100 similar to notches 78 and ball bearings 76 respectively in the disc 40 for receiving an outermost ring 102. This ring 102 is much the same as the ring 74 for receiving the sugar cylinders 70. The ring 102 rides on ball bearings 104 disposed in a race 106 formed in the plate 30 and the panel 52 as shown in Fig. 4.

The uppermost support for the cylinders 70 constitutes a disc 108 formed at its outermost edge as in discs 56 and 88 to receive plugs 110. This disc 108 has a hub 112 circumscribing the bearing 80 and overlapping the upper edge of bearing 86 for support thereby.

Rotation of the three drums just described for cylinders 48, 66 and 70 respectively, is accomplished through use of three sheaves numbered 114, 116 and 118. Underlying each of the sheaves 114 and 116 is a plate 120 and 122 respectively, while the sheave 118 is provided with a flange 124 therebelow which forms a part of the hub 108. The plate 120 is affixed directly to the shaft 34 by a set screw 126. The plate 122 circumscribes the sleeve 82 and is keyed thereto as at 128 as well as resting on the bearing 86 as shown.

Each of the sheaves 114, 116 and 118 has an opening 130 formed therein for receiving a downturned leg 132 of a spring loaded dog 134, pivotally secured to the uppermost faces of the respective sheaves 114, 116 and 118. This leg 132 of the dogs 134 is received by notches 136 formed in each of the plates 120 and 122 and in the flange 124 of the disc 108.

When the dogs 134 are thus engaged with the respective notches 136, it is clear that each of the plates 120 and 122 will rotate with the respective sheaves 114 and 116 and that the flange 124 and its disc 108 will rotate with the sheave 118. Therefore, rotation of sheave 114 will in turn rotate its plate 120, the shaft 34 and the discs 56 and 40, to move the cylinders 48 through a circular path of travel.

Rotation of the sheave 116 will cause rotation of the cylinders 66 by rotation of the plate 122 underlying the sheave 116, the sleeve 82 and the disc 88 secured to the sleeve 82. The disc 74 will follow such rotation by virtue of the connecting pins 96.

When the sheave 118 is caused to rotate, the disc 108 will also rotate when its dog 134 is engaged with the notches 136 in the flange 124. As shown in Figs. 3 and 4, both the disc 108 and the ring 102 have gear teeth 138 and 140 respectively, formed on the outermost edges thereof. A vertical shaft 142, journalled in suitable bearings (not shown), carries a pinion 144 at the bottom thereof in mesh with teeth 140 of ring 102 and a second pinion 146 in mesh with teeth 138 on disc 108. Such construction maintains the cylinders 70 vertical as the ring 102 is rotated by the disc 108 through the shaft 142.

*Driving mechanism for ingredient dispensing assembly*

As clearly illustrated in Figs. 4 and 5, each of the sheaves 114, 116 and 118 has a groove 148, 150 and 152 respectively formed therein for receiving cables 154, 156 and 158. These cables each have one end thereof fixed to the respective sheaves 114, 116 and 118 and their opposite ends tied to a weight (not shown) after passing over a pulley (not shown). There is a weight and pulley for each cable, both being mounted within tubes 160 shown in Fig. 3. For purposes of condensing all the parts of the ingredient dispensing assembly in a relatively small space, the tube for sheave 114 is disposed to tend to rotate shaft 34 in the opposite direction of rotation of sheaves 116 and 118.

Means for controlling rotation of the sheaves 114, 116 and 118 due to pull exerted thereupon by the aforesaid weights attached to cables 154, 156 and 158 is shown in Fig. 2, on an enlarged scale in Fig. 3 and partially detailed in Fig. 5. Solenoids 162, 164 and 166 are provided for sheaves 114, 116 and 118 respectively. Interconnection between these solenoids and the respective sheaves is substantially the same; therefore, only one will be explained.

As shown in Fig. 5, three spaced apart elongated bars 168, 170 and 172 are secured in depending relation to the lowermost face of the top wall 38 of the chamber 30 by a pair of bolts 174, said bolts 174 having spacers 176 thereon for holding the bars 168, 170 and 172 in said spaced relation.

A pin 178 depends from each of the bars 168, 170 and 172 and each of the pins 178 carries a bushing 180, which in turn has a pawl 182 secured thereto by press fit mounting. It is clear that the pawls 182 are freely pivoted on the respective pins 178 by virtue of the bushings 180, said pins having a head 183 for holding the pawls 182 and the bushings 180 in place.

The pawls 182 are substantially T-shaped as shown in Fig. 3, two legs thereof extending in opposite directions radially from the pin 178 and terminating in down-turned ears 184 and 185. The third leg of the pawls 182, pivotally connect at the outermost end thereof with a link 186 which in turn has pivotal connection with a spring-loaded core 188 of the respective solenoids 162, 164 and 166.

Referring now to the uppermost pawl 182 which has connection as above described with the solenoid 162, it is clear in Fig. 3 that when the solenoid 162 is de-energized as shown, the ear 184 of the pawl 182 will be in engagement with one of a plurality of teeth 190 formed on the sheave 114. The sheaves 114, 116 and 118 all have these teeth 190 formed thereon throughout their peripheral edges and extending outwardly from the respective grooves 148, 150 and 152 formed therein.

When the solenoid 162 is energized to move its core 188 inwardly, the uppermost pawl 182 will be caused to swing on its pin 178 to move the downturned ear 184 out of engagement with one of the teeth 190. Such movement of this pawl 182 will move the ear 185 in the path of travel of a tooth 190 next in advance to the tooth being held by the ear 184. Release of the sheave 114 will cause the same to be rotated in the direction shown by arrow in Fig. 3 by virtue of the cable 154 and weight affixed thereto. De-energization of the solenoid 162 will release ear 185 and move ear 184 into the path of travel of the teeth 190.

It is clear from the foregoing that step-by-step movement of the sheaves 114, 116 and 118 is controlled by the solenoids 162, 164 and 166, and that each step constitutes two distinct operations. In other words, the sheaves 114, 116 and 118 will rotate approximately half the distance of each step on energization of the respective solenoids 162, 164 and 166 and the other half on de-energization of such solenoids. It is to be noted that the angularity of the teeth 190 of the sheave 114 is opposite to that of the teeth 190 of each of the sheaves 116 and 118 because of the opposite directions of rotation as above described.

*Ingredient feeder and control for driving mechanism of ingredient dispensing assembly*

Figure 6:
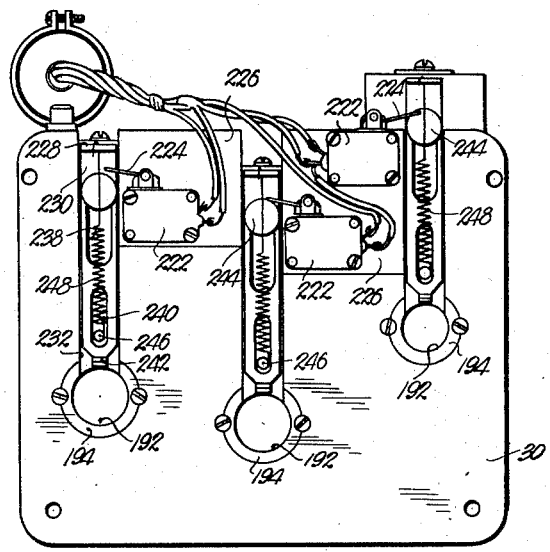
Fig. 6 is a detailed plan view of a switch actuating assembly operable by the ingredient feeding mechanism.
Figure 7:
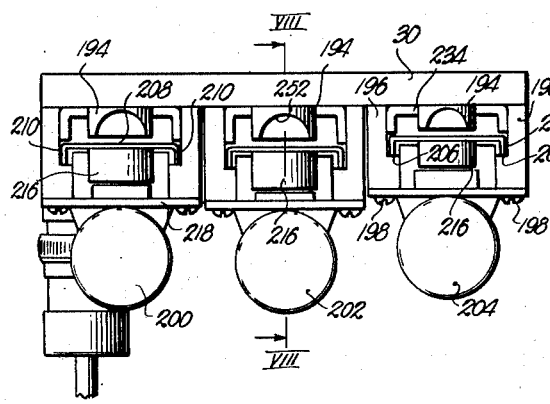
Fig. 7 is a fragmentary end elevational view of the ingredient feeding mechanism.
Figure 8:
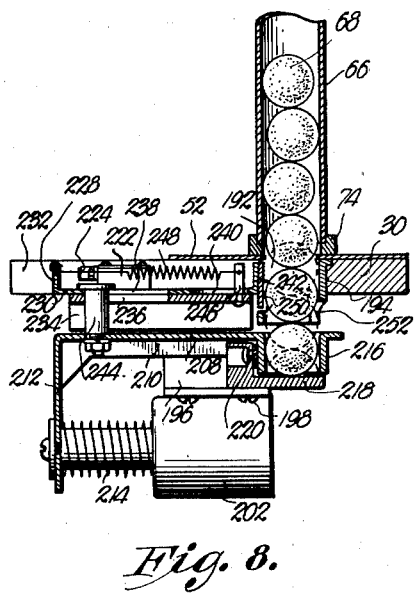
Fig. 8 is a fragmentary, detailed, cross-sectional view taken on line VIII—VIII of Fig. 7.

Discharge of the pellets 50, 68 and 72 from their respective cylinders 48, 66 and 70 and control of the solenoids 162, 164 and 166 are accomplished by structure shown in detail in Figs. 6, 7 and 8. This structure is the same for each of the cylinders 48, 66 and 70. There are three discharge openings 192 formed in the panel 52 and the plate 30, disposed in underlying relationship and within the path of travel of the respective cylinders 48, 66 and 70. Each of these discharge openings 192 has cylindrical lining 194 therein extending a distance below the plate 30 as is clear in Figs. 7 and 8.

Depending from and secured to the lowermost face of the plate 30 is a pair of spaced apart brackets 196, which brackets 196 in turn have an underlying solenoid secured thereto by screws or the like 198. There are three of these solenoids, designated 200, 202 and 204 for pellets 72, 68 and 50 respectively.

The brackets 196 are provided with opposed internal shoulders 206 for receiving a slide 208, this slide being U-shaped in cross-section, and the legs 210 thereof resting directly on such shoulders 206.

The slide 208 has a down-turned flange 212 integral therewith for receiving the outermost end of a spring-loaded core 214 for each of the solenoids 200, 202 and 204. An open top and open bottom cup 216 is formed in each of the slides 208 near one end thereof opposite to the flange 212, these cups 216 extending below the slide 208 and being normally in alignment with the discharge opening 192. A plate 218 underlies the open bottom of the cup 216 when the slide 208 is in the normal position shown in Fig. 8, and has a resilient bumper 220 engageable by the cup 216 when the latter is moved to the position underlying the discharge opening 192 by the action of the spring on the core 214.

Three electric switches 222 having arms 224 are secured to the lowermost face of the plate 30 in depressions 226 formed in plate 30 as shown in Fig. 6. These arms 224 are disposed in the path of travel of an up-turned flange 228 formed on one end of a plunger 230. This plunger 230 is disposed within a slot 232 formed in the plate 30 and is slidable on a bracket 234 underlying the slot 232 and secured to the plate 30 and the brackets 196.

The bracket 234 and the plunger 230 have normally aligned and registering slots 236 and 238 respectively formed therein and the plunger 230 has an additional slot 240 disposed near one end thereof opposite to flange 232, there being a second up-turned flange 242 on this said one end of the plunger 230.

A pin 244 secured to the uppermost face of the slide 208 extends upwardly through the slots 236 and 238, and a pin 246 secured to the bracket 234 passes upwardly through the slot 240 in the plunger 230. A spring 248 joining the pin 246 and the flange 228 of the plunger 230 tends to slide the plunger 230 on the bracket 234 and within the slot 232 toward the pellet 68 within the discharge opening 192. The slot 232 is placed in register with the discharge opening 192 through an opening 250 formed in the liner 194.

When the solenoid 202 is de-energized as shown in Fig. 8, the pin 244 will be in engagement with one end of the slot 238 to hold the spring 248 loaded and to maintain the flange 242 out of discharge opening 192, permitting free movement of the pellets 68 from the cylinder 66 through the liner 194 and into the cup 216.

When the solenoid 202 is energized, core 214 will move inwardly to shift the slide 208 to a position where the cup 216 will be beyond the plate 218, the lowermost pellet 68 thereby falling to a point of use (hereinafter more fully described). The uppermost face of the slide 208 will move to underlying engagement with the remaining pellets 68 and prevent further discharge of such pellets 68 until the cup 216 is returned to the position shown in Fig. 8.

Such movement of the slide 208 will cause the pin 244 to slide in slots 236 and 238, and the spring 248 will slide the plunger 230 until the flange 242 contacts one of the remaining pellets 68 in the discharge opening 192. In the event however, that the discharge pellet 68 is the last of the pellets 68 emanating from the cylinder 66, then the plunger 230 will be moved to a position where the flange 242 is within the liner 194. Such full movement of the plunger 230 will move the flange 228 to a position engaging the switch arm 224 and actuating the switch 222.

The three switches 222 are normally open and are interposed in an electrical circuit supplying energy to the respective solenoids 162, 164 and 166. Such electrical connections will hereinafter be described when referring to Fig. 21. Closing of such switches 222 will, therefore, cause energization of the appropriate solenoid 162, 164 or 166 to permit rotation of the cylinders 48, 66 or 77 and thereby move the next successive full cylinder over the discharge opening 192 to replace the pellets 50, 68 or 72 as the case may be.

The liner 194 has a cut-away portion 252 formed therein as shown in Figs. 7 and 8. In the event a broken pellet 68 falls into the cup 216, as shown by dotted lines in Fig. 8, then the next full pellet 68 next above such broken pellet will be free for feeding therewith when the slide 208 is actuated. Otherwise a broken pellet would cause sheaving of all successive pellets 68 until the entire cylinder 66 becomes empty.

Cup dispenser

Suitably mounted within the cabinet 10 is a compartment defined by a circular shell 254 held in spaced relationship to an upper wall 256 and a lower wall 258 by rods 259 secured to such walls 256 and 258 and to the shell 254 by straps 260.

Extending upwardly through the bottom wall 258 is a post 262 held in place by bolts 264 and provided with a central bore to rotatably receive a short shaft 266. Resting upon the uppermost end of the shaft 266 and secured thereto is a plate 268 and a ring 270 contoured to receive a loop 272 and the lowermost end of an inner shell 274 fastened to the loop 272.

The ring 270 has mounted therein and extending below its lowermost edge, a drum 276 provided with an outturned flange 278 received by a circular groove 280 formed in the uppermost face of the wall 258. A shelf 282 is mounted on the drum 276 for receiving stacks of cups 284 extending upwardly into the shell 254.

Partition structure for the stacks of cups 284 is interposed between the shells 254 and 274 and secured to the latter. This structure comprises a single sheet of material bent as shown in Figs. 15 and 16 to conform to the contour of substantially half of the cups 284. Thus, a number of elongated, vertical stalls 286 which are arcuate in cross-section, are presented for receiving the stacks of cups 284. These stalls 286 cooperate with the inner face of the shell 254 in holding the cups 284 in stacked relation and are continuous throughout the outer face of the shell 274. It is contemplated that a number of vertical rods may be utilized to supplant this type of partition, if desired, to decrease weight and expense of manufacture without hampering the function thereof. It is to be noted that the outermost face of the ring 270 is also arcuately contoured to receive the lower portion of the stacks of cups 284.

The shell 274 has a top 288 provided with a bearing 290 receiving a pin 292 depending from the wall 256. Keyed to the shaft 266 at the lowermost end thereof is a sleeve 294 for mounting a disc 296 having teeth 298 formed thereon. This disc 296 is caused to rotate by a solenoid 300 mounted on the lowermost face of the wall 258.

An arm 302 below wall 258 extends radially from the post 262 to pivotally mount a pawl 304 as at 306, said pawl 304 having down-turned ears 308 and 310. A bolt 312 slidably mounted in a bracket 314 has a spring 316 yieldably holding the opposite end of the bolt 312 against a core 318 of the solenoid 300. A pin 320 pivotally interconnects the bolt 312 and the pawl 304.

A tube 322 extending between the walls 256 and 258 and affixed thereto exteriorly of the shell 254 has a weight 324 therein provided with a pulley 326 at its uppermost end. A cable 328 has one end thereof fixed at the top of the tube 322 and is threaded on the pulley 326. This cable 328 then passes through an opening at the top of the tube 322, over rollers 330 and 332 near the top and bottom respectively of the tube 322 and has its opposite end coiled about the drum 276 and joined thereto.

A cam 334, mounted on the disc 296, is disposed to contact an arm 336 of a normally closed switch 338 to open said switch 338 at the end of one complete revolution of the disc 296 for purposes hereinafter set forth.

It is clear that rotation of the shell 274 together with the partition structure 286, the shelf 282 and the stacks of cups 284 will be accomplished by virtue of the weight 324. Energization of the solenoid 300 to move its core 318 against the bolt 312 will release flange 308 of pawl 304 from the tooth 298 of disc 296 as shown in Fig. 17. The flange 310 will engage the next tooth 298 when the weight 324 causes rotation of the drum 276 and the disc 296. When the solenoid 300 is de-energized, flange 310 will be released and the flange 308 will catch the tooth just released by flange 308 completing one step in the rotational progress of the cup dispenser 12.

Such operation will cause one stack of the cups 284 to strike a cam 340 located below and to one side of the stacks of cups 284. This cam is directly above a discharge opening 342 formed in the bottom wall 258. A cup feeder 344 of conventional character is mounted on the wall 258 in register with the discharge opening 342. This feeder 344 has a number of dogs 346 designed to hold a cup 284 when in one position and swingable to another position for forcing a cup into a chute 348 when in another position. A solenoid 350, having its core 352 connected to an arm 354 for driving the dogs 346, serves as the controlling means for the feeder 344.

The solenoid 300 is interposed in an electrical circuit (hereinafter set forth) with a normally open switch 356. This switch 356 has leaf spring arm 358 held normally open by the stack of cups 284 within the discharge opening 342. When this stack has been used to a point where the top cup 284 of the stack passes below the arm 358, switch 356 will be closed to close said circuit through the solenoid 300, thereby moving the next stack of cups 284 into feeding position. When the last stack has been used to this extent, movement of disc 296 through action of switch 356 will cause cam 334 to open the switch 338 and deenergize virtually every electrical circuit of the machine, rendering it inoperable until the cup dispenser 12 is refilled with cups 284, all as hereinafter more fully explained.

*Pellet crusher*

The crusher 18 is mounted as shown in Figs. 1 and 9 to receive pellets 50, 68 and 72 from the respective cups 216, there being a hopper 356 registering with an inlet opening 358 formed in a housing 360 for the crusher 18. This housing 360 has a front section 362, a back section 364 and a top 366, all bolted or otherwise secured together to present a hollow chamber for receiving the pellets to be crushed and a rotatable rotor 368.

The rotor 368 has a hub 370 for receiving a shaft 372 of an electric motor 374, the distance which rotor 368 extends into the housing 360 being controlled by a set screw 376, and having a second set screw 378 serving to hold the same on shaft 372. The hub 370 passes through an opening 380 formed in the section 364 of housing 360. The motor 374 is mounted on a bracket 382 depending from the plate 30 of the dispensing assembly 14 and has connection with housing 360 through bolts 384.

The pellets are directed into the opening 358 where the same are guided toward the center and bottom of the interior of housing 360 by a passageway 385 defined on one side by a baffle 386 extending into the housing 360 from opening 358 and disposed to overlap a portion of the rotor 368. Such passageway 385 assures that the pellets will not become momentarily retarded holding back further pellets nor be struck by the rotor 368 before the same are fully within the housing 360.

In addition to the hub 370, rotor 368 includes a disc-shaped portion 388 having the innermost face thereof inclined inwardly toward its center. A conical boss 390 is formed at this center of the innermost face to direct the pellets radially outwardly into ribs 392. These ribs 392 are integral with the rotor 368 and triangular in cross section to present a sharp cutting edge for breaking the pellets into relatively small particles.

The section 362 of the housing 360 completely circumscribes the disc portion 388 of the rotor 368 with the exception only of an outlet opening 394 opposed to the opening 358. Formed in this circumscribing portion of section 362 is a groove 396. This groove 396 is arcuate in cross-section, commencing from a point spaced from outlet opening 394 and to the left thereof as viewed in Fig. 10 and progressively increasing in depth as the opening 394 is approached from the opposite side. In other words, the section 362 of housing 360 is relatively close to the peripheral edge of the rotor 388 at point 398 and has its maximum spacing at point 400.

The marginal edge of the disc portion 388 of rotor 368 is confined between section 362 on one side thereof and by section 364 on its opposite side, the ribs 392 being beveled outwardly as at 402 to accommodate such portion of section 362. A rib 397 is on section 362 to cooperate with ribs 392 in crushing the pellets.

A continuous out-turned flange 404 is formed on the edge of disc 388 to confine the broken pellets within the groove 396. In furtherance of such sealing, a circular rib 406 and groove 408 on section 364 and the outermost face of disc 388, are formed for interlocking relationship as shown in Fig. 11.

It is clear that the particles of pellets broken by the ribs 392 will be thrown by centrifugal force toward the outermost edges of rotor 388. When such particles become sufficiently broken, the same will pass into the grooves 396 for discharge through the opening 394. The fineness of crushing will be determined by the distance the marginal edge of disc 388 is disposed from the section 362, all as governed by the set screw 376.

Hot water is directed into the housing 360 from the boiler 20 by means of a conduit 410 having connection with housing 360 by a boss 412.

This water will be admixed with the crushed pellets by virtue of the rotating rotor 388, the entire mixture passing from opening 394.

A specially formed nozzle 414 is fitted into the opening 394 at an angle to the end that the dispensed drink will be directed against the side of dispensed cup 284 as shown in Fig. 1, thereby avoiding splashing and foaming in cup 284. This nozzle 414 is also provided with a baffle 416 as shown in Fig. 13 and a restricted opening 418 to prevent swirling of the drink as it passes through the nozzle 414 into cup 284. A heating unit 420 mounted within the housing 360 maintains the entire crusher 18 in a heated condition whereby the hot water emanating from boiler 20 will not cool before passage from the nozzle 414.

Electrical Operations

Figure 21:
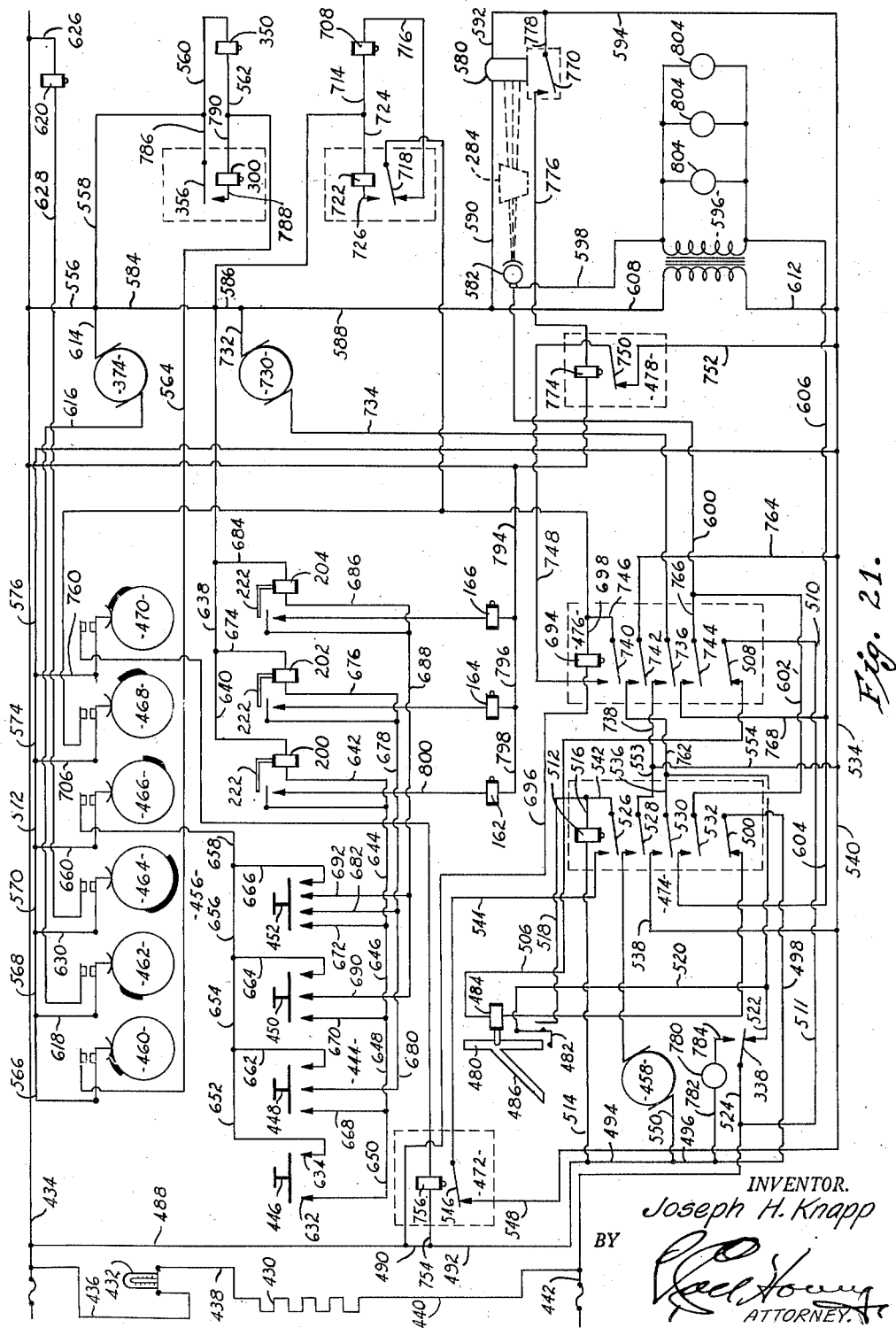
Fig. 21 is a schematic wiring diagram illustrating the electrical apparatus constituting a portion of the hot coffee making machine.

As shown in Fig. 21 of the drawings, a heating element 430, controlled by a thermostat 432, maintains water in boiler 20 at a predetermined temperature and the circuit therefor is traced as follows:

From lead line 434 through wire 436, thermostat 432, wire 438, heating element 430, and wire 440 to lead line 442.

Lead lines 434 and 442 are connected to a suitable source of electrical energy, not shown.

A coin controlled switching assembly broadly designated by the numeral 444 may be made in accordance with my co-pending application bearing Serial No. 694,841, filed September 5, 1946, and entitled "Selective Coin Operated Switch," now Patent No. 2,477,133. Such assembly is provided with four switches 446, 448, 450 and 452, designed to be actuated by insertion of a coin in corresponding slots formed in one wall of cabinet 10, each switch being adapted to automatically lock in a circuit closing position when actuated and to release any previously locked switch.

The sequence of operation of each cycle is controlled by a program switch broadly designated 456. This program switch 456 includes a motor 458 having a number of disc-like cams mounted on its shaft. These cams are designated by the numerals 460, 462, 464, 466, 468 and 470, each having associated therewith a normally open switch, as clearly illustrated in Fig. 21.

Four relays 472, 474, 476 and 478 also form a part of the electrical phase of the vending machine. The relay 474 is energized by the coin inserted by the customer to select the drink desired. Such coin passes from the switching assembly 444 through a chute 480 and momentarily closes a switch 482 before passing to a coin box (not shown).

A coin reject solenoid 484 has the free end of its core movable into chute 480 to deflect coins inserted after the machine starts operating into a coin return chute 486. This solenoid 484 is held normally open through the following circuit.

From lead line 434 through wires 488, 490, 492, 494, 496 and 498 normally closed contacts 500 of relay 474, wire 502, solenoid 484, wire 506 normally closed contacts 508 of relay 476, and wires 510 and 511 to line 442.

When the coin closes switch 482 as above described, a coil 512 of relay 474 is energized through the following circuit:

From lead line 434 through wires 488, 490, 492 and 514, coil 512, wires 516 and 518, switch 482, wires 520 and 522, the normally closed side of switch 338 (see Fig. 17) and wire 524 to lead line 442.

Energization of relay 474 in this manner closes four contacts forming a part of relay 474 and numbered 526, 528, 530 and 532 and opens contacts 500.

When the contacts 530 are thus closed, lead line 442 is interconnected with a main line 534. This circuit is traced as follows:

From lead line 442 through wire 524, switch 338, wires 522 and 536, contacts 530 and wires 538 and 540 to main line 534.

Closing of contacts 526 holds relay 474 locked in through the following circuit:

From line 434, through wires 488, 490 and 514, coil 512, wires 516 and 542, contacts 526, wire 544 normally closed contacts 546 of relay 472 and wires 548 and 540 to line 534.

With contacts 500 of relay 474 open, solenoid 484 will remain deenergized until relay 474 is again deenergized as hereinafter described, thus deflecting all subsequently inserted coins into chute 486.

Closing of contacts 528 of relay 474 will close the following circuit through motor 458 of program switch 456:

From lead line 434 through wires 488, 490, 492, 494 and 550, motor 458, wire 552, contacts 528 and wires 553 and 554 to line 534.

As soon as motor 458 is thus energized, cam 460 will rotate to close its contacts, thereby energizing the cup dispenser solenoid 350 through the following circuit:

From lead line 434, wires 556, 558 and 560, solenoid 350, wires 562 and 564, closed contacts of cam 460 and wires 566, 568, 570, 572, 574 and 576 to line 534.

When all cups 284 are depleted from one row thereof, switch 356 is closed to energize solenoid 306, thereby advancing the next row of cups. This circuit is traceable as follows:

From lead line 434 through wires 556, 558 and 786, closed switch 356, wire 788, solenoid 306, wires 790 and 564, closed contacts of cam 460, and wires 566, 568, 570, 572, 574 and 576 to line 534.

The cup 284 thus dispensed falls upon a platform 578 forming a part of the cabinet 10 (see Fig. 1) intercepting a beam of light passing between a photo-electric cell 580 and an exciter lamp 582. The cell 580 is energized as soon as contacts 530 of relay 474 close through the following circuit:

From lead line 434 through wires 556, 584, 586, 588 and 590, cell 580 and wires 592 and 594 to line 534.

The circuit for lamp 582 is traced as follows:

From secondary winding of a transformer 596 through wire 598, lamp 582, wires 600 and 602, contacts 532 of relay 474, and wires 604 and 606 to said winding of transformer 596.

The primary winding of transformer 596 receives energy through the following circuit:

From lead line 434, through wires 556, 584, 586, 588 and 608, primary winding of transformer 596 and wire 612 to line 534.

Interception of the beam of light between lamp 582 and cell 580 permits switch 614 to return to a closed position until cup 284 is removed by the customer as will hereinafter be more fully explained.

As motor 458 continues to operate, cam 460 will move to a position reopening its switch and the switch of cam 462 will be closed to start the pellet crusher motor 374.

This circuit is traceable as follows:

From lead line 434 through wires 556 and 614, motor 374, wire 616, closed switch of cam 462, wires 618, 568, 570, 572, 574 and 576 to line 534.

Next, a solenoid 620 for actuating a valve 622 (see Fig. 1) to permit flow of water from boiler 20 to crusher 18 through conduit 410 is energized by the closing of the contacts of cam 464. This circuit is traced as follows:

From lead line 434 through wire 626, solenoid 620, wire 628, closed contacts of cam 464 and wires 630, 570, 572, 574 and 576 to line 534.

The contacts of cam 466 close next to dispense the pellets selected by the customer upon deposit of a coin in the switching assembly 444. Assuming the customer desired black coffee, he deposited a coin in the slot so marked, thus closing switch 446. With switch 446 locked in a closed position, contact points 632 and 634 will be bridged and a coffee pellet dispensed by solenoid 200 after cam 466 moves to an operative position through the following circuit:

From lead line 434, wires 556, 584, 636, 638 and 640, solenoid 200, wires 642, 644, 646, 648 and 650, contact point 632, switch 446, contact point 634, wires 652, 654, 656 and 658, contact points of cam 466 and wires 660, 572, 574 and 576 to line 534.

If either switch 448, 450 or 452 is actuated by the customer, coffee pellets will likewise be dispensed through virtually the same circuit. Each switch 448, 450 and 452 has a contact point in connection with the line formed by wires 652, 654, 656 and 658 through wires 662, 664 and 666 respectively. These switches 448, 450 and 452 are also connected to the line formed by wires 650, 648, 646 and 644 by wires 668, 670 and 672 respectively.

When switch 448 is closed, not only coffee pellets are dispensed but solenoid 202 is energized to dispense cream pellets through the following circuit:

From lead line 434, wires 556, 584, 636, 638 and 674, solenoid 202, wires 676, 678 and 680, switch 448, wires 662, 654, 656 and 658, closed contacts of cam 466, and wires 660, 572, 574 and 576 to line 534.

Closing of switch 452 also causes dispensing of cream pellets because of a contact point thereof being connected by a wire 682 to the line defined by wires 680 and 678, and another contact point joined by wire 666 to the line formed by wires 652, 654, 656 and 658.

Closing of switch 450 dispenses sugar pellets along with coffee pellets through the following circuit:

From lead line 434, wires 556, 584, 636 and 684, sugar feeding solenoid 204, wires 686, 688 and 690, switch 450, wires 664, 656, and 658, cam switch 466 and wires 660, 572, 574, and 576 to line 534.

Switch 452, when closed, also causes dispensing of sugar pellets because of a wire 692 that is connected to a line made up of wires 690 and 688.

Thus it is seen that the coffee solenoid 200 is energized whenever switch 446, 448, 450 or 452 is closed. Closing of switches 448 and 452 will energize the cream dispensing solenoid 202, and sugar is dispensed by energizing solenoid 204 whenever switch 450 or 452 is closed. The customer thus has a selection of black coffee, coffee and cream, black coffee and sugar or coffee with both cream and sugar.

As above described, when either coffee, cream or sugar pellets are depleted from a respective tube therefor, the solenoids 200, 202 and 204 respectively, operate to close a corresponding switch 222. This energizes either solenoid 162, 164 or 166, as the case may be, to move another tube of pellets into a dispensing position.

The circuit through solenoid 162 is traced as follows, assuming contact 446 to be closed:

From line 434, through wires 772, 794, 796 and 798, solenoid 162, wire 800, closed switch 222, wires 802, 644, 646, 648 and 650, points 632 and 634 of switch 446, wires 652, 654, 656 and 658, closed contacts of cam 466, and wires 660, 572, 574, and 576 to line 534.

As shown in Fig. 21, the switches 222 actuated by solenoids 202 and 204 and the solenoids 164 and 166 are connected in series parallel with this circuit to replenish cream and sugar tubes respectively when either switch 446, 448, 450 or 452 is closed.

The next cam switch to be closed by motor 458 is 468. This energizes a coil 694 of relay 476 through the following circuit:

From lead line 434 through wires 488 and 696; coil 694, wires 698, 700, 702 and 704, closed switch of cam 468, and wires 706, 574 and 576 to line 534.

When relay 476 is thus energized, its contacts 736, 740, 742 and 744 are all closed and its contacts 508 opened. Closing of the contacts 740 locks in relay 476 through the following circuit:

From lead line 434, through wires 488 and 696, coil 694, wires 698 and 746, contacts 740, wire 748, normally closed contacts 750 of relay 478 and wire 752 to line 534.

Simultaneously a solenoid 708 is energized to release a spoon through chute 710 (see Fig. 1) into the dispensed cup 284. The spoon dispenser 16 is of conventional character and the circuit is traced as follows:

From lead line 434, through wires 556, 584, 712 and 714, solenoid 708, wire 716, closed side of a switch 718, wires 720 and 704, closed contacts of cam 468 and wires 706, 574 and 576 to line 534.

Steam rising from the coffee in cup 284 is blown to the atmosphere by a fan 728 that is disposed to direct such steam away from the pellets within the compartment 14. This fan 728 is driven by a motor 730, the latter being energized through the following circuit:

From lead line 434, through wires 556, 584, 586 and 732, motor 730, wire 734, closed contacts 736 of relay 476 and wires 738 and 554 to line 534.

When the contacts of cam 470 close, relay 474 is deenergized through energization of relay 472. This opens the contacts 546 of relay 472 to open the holding circuit above described through contacts 526 of relay 474.

The circuit for energizing relay 472 is traced as follows:

From lead line 434, wires 488, 490 and 754, coil 756 of relay 472, wire 758, closed contacts of cam 470, and wires 760 and 576 to line 534.

When relay 474 is thus deenergized, its contacts 528 will open to deenergize the motor 458 that operates the switching assembly 456.

The coin reject solenoid 484 will remain deenergized though contacts 590 of relay 474 are now closed because relay 476 remains energized and its contacts 508 remain open.

The lead line 442 remains connected with main line 534 regardless of opening of contacts 530 of relay 474 because of the following circuit:

From lead line 442, wire 524, normally closed switch 338, wires 522 and 762, closed contacts 742 of relay 476, and wire 764 to line 534.

The exciter lamp 582 also remains energized regardless of opening of contacts 532 of relay 474 because of the following circuit:

From secondary winding of transformer 596, through wire 598, lamp 582, wires 600 and 766, closed contacts 744 of relay 476, and wires 768 and 606 to the secondary winding of transformer 596.

When the customer removes the cup 284 from the platform 578, the beam of light between exciter lamp 582 and photo-electric cell 580 will be connected, causing closing of a switch 770 of cell 580, thus energizing relay 478. This circuit is traced as follows:

From lead line 434 through wires 772 and 792, a coil 774 of relay 478, wire 776, switch 770 and wires 778 and 594 to line 534.

Energization of this relay 478 opens switch 750 thereof to deenergize relay 476, the holding circuit for relay 476 through its contacts 740 thus being broken.

Closing of the contacts 508 of relay 476 will cause energization of solenoid 484 to the end that coins may pass through chute 489 to the coin box.

The fan motor 730 will be deenergized not only because of opening of contacts 736 of relay 476 but because of opening of contacts 742 which disconnects lead line 442 and main line 534.

By the same token, lamp 582 will be deenergized because of opening of contacts 744 and 742 of relay 476, the contacts 742 opening to break the connection between lines 442 and 534 to deenergize the transformer 596.

When line 534 is thus deenergized, cell 580 will receive no more current and with lamp 582 also deenergized, switch 770 will open and coil 774 will return to a deenergized condition, closing contacts 750.

It is to be noted that when all cups are dispensed, switch 338 will move from the normally closed position, making it impossible to join line 442 and 534. The machine will also not operate because closing of switch 482 will fail to energize relay 474. This switch 338 moves to close the following circuit through a "sold out" lamp 780:

From lead line 434, through wires 488, 490, 492, 494, 496 and 782, lamp 780, wire 784, switch 338 and wire 524 to line 442.

A number of flood lamps 804 for illuminating the dispensed cup 284 are shown in Fig. 21 connected in series parallel with the secondary of transformer 596 for energization when the line 534 receives energy.

Having thus described the invention, what is claimed as new and desired to be secured by Letters Patent is:

1. In a hot coffee making machine of the character described, a pellet dispensing assembly comprising a horizontal plate having an outlet opening formed therein; a plurality of open bottom, vertical cylinders for said pellets arranged in a circle above said plate; means for successively moving said cylinders to a position in alignment with said opening in the plate; and a device for feeding pellets passing through the opening singly to a point of use, said cylinders having supporting framework including an upper and a lower rotatable member, and parts interconnecting said members whereby the cylinders are maintained in said vertical position as rotative force is applied to the uppermost member, said means including a rotatable sheave having releasable means joining the same with said uppermost member, said uppermost member having a circular plate provided with notches throughout its peripheral edge, said releasable means comprising a spring loaded dog selectively movable into any one of said notches of the circular plate.

2. In a hot coffee making machine of the character described, a pellet dispensing assembly including a horizontal plate having an outlet opening formed therein, a rotatable drum having a plurality of open bottom cylinders for said pellets, said cylinders being movable successively over said opening in the plate as the drum rotates whereby pellets drop by gravity from the cylinders through the outlet opening; a device including a reciprocable slide for feeding pellets passing through said opening singly to a point of use; and structure operable upon reciprocation of said slide for controlling the rotation of said drum, said drum having means for rotating the same and a solenoid controlled stepping assembly for permitting rotation of the drum in step-by-step sequence, said structure including a switch operable to close an electrical circuit through the solenoid for energizing the same, and a plunger engageable by said slide and reciprocable therewith when the outlet opening is void of pellets for actuating said switch.

3. In a hot coffee making machine of the character described, a pellet dispensing assembly including a horizontal plate having an outlet opening formed therein, a rotatable drum having a plurality of open bottom cylinders for said pellets, said cylinders being movable successively over said opening in the plate as the drum rotates whereby pellets drop by gravity from the cylinders through the outlet opening; a device including a reciprocable slide for feeding pellets passing through said opening singly to a point of use; and structure operable upon reciprocation of said slide for controlling the rotation of said drum, said drum having means for rotating the same and a solenoid controlled stepping assembly for permitting rotation of the drum in step-by-step sequence, said structure including a switch operable to close an electrical circuit through the solenoid for energizing the same, and a plunger engageable by said slide and reciprocable therewith when the outlet opening is void of pellets for actuating said switch, said plunger being rendered inoperable when a pellet is disposed within the outlet opening by moving into engagement therewith when the slide is reciprocated in one direction.

JOSEPH H. KNAPP.

REFERENCES CITED

The following references are of record in the file of this patent:

UNITED STATES PATENTS

| Number | Name | Date |
|---|---|---|
| 411,123 | Harigel | Sept. 17, 1889 |
| 912,455 | Finney | Feb. 16, 1909 |
| 1,520,560 | Burno | Dec. 23, 1924 |
| 1,602,358 | Getskay | Oct. 5, 1926 |
| 1,619,883 | Puket et al. | Mar. 5, 1927 |
| 1,969,590 | Turgill et al. | Aug. 7, 1932 |
| 2,019,016 | McLellan | Oct. 29, 1935 |
| 2,100,860 | Lobley | Nov. 30, 1937 |
| 2,261,338 | Carlson | Nov. 4, 1941 |
| 2,278,013 | Nicholson | Mar. 31, 1942 |
| 2,334,806 | Boylan | Nov. 23, 1943 |
| 2,370,848 | Doggett | Mar. 6, 1945 |
| 2,462,019 | Bowman | Feb. 15, 1949 |